Perl Edward DeFord
INVENTOR.

Jan. 20, 1959 P. E. DE FORD 2,869,398
HYDRAULIC AND PLANETARY GEAR TRANSMISSION
Filed Jan. 30, 1958 4 Sheets-Sheet 2

Perl Edward DeFord
INVENTOR.

BY
Attorneys

Jan. 20, 1959 P. E. DE FORD 2,869,398
HYDRAULIC AND PLANETARY GEAR TRANSMISSION
Filed Jan. 30, 1958 4 Sheets-Sheet 3
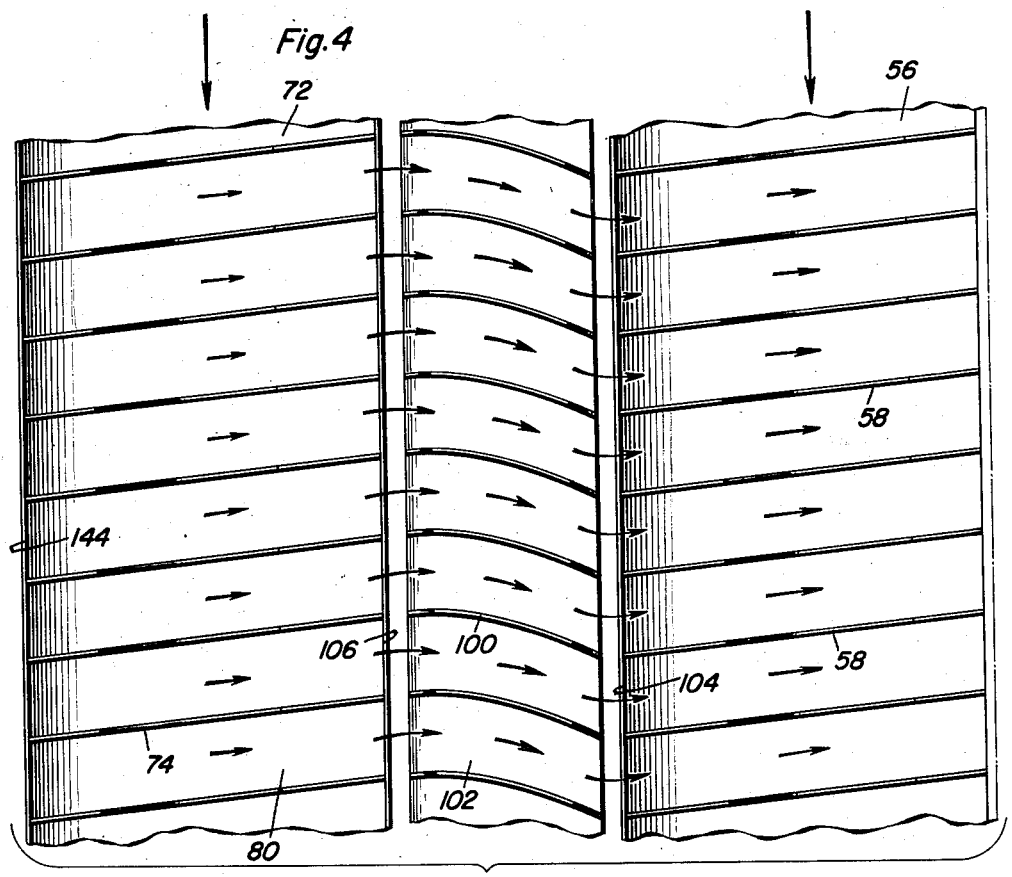
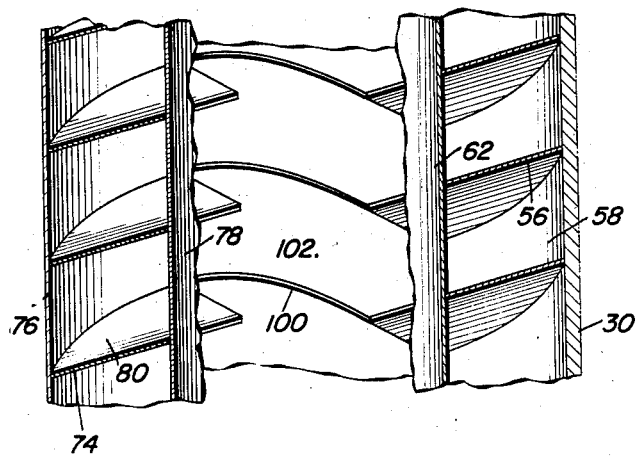
Perl Edward DeFord
INVENTOR.

Perl Edward DeFord
INVENTOR.

United States Patent Office 2,869,398
Patented Jan. 20, 1959

2,869,398

HYDRAULIC AND PLANETARY GEAR TRANSMISSION

Perl Edward De Ford, Twin Falls, Idaho, assignor of twenty-five percent to Reed Goold and twenty-five percent to Emerson Tolman, both of Twins Falls, Idaho Application January 30, 1958, Serial No. 712,220

2 Claims. (Cl. 74—688)

This invention relates to a combined hydraulic and planetary gear transmission and is of the same type as my prior transmission described in U. S. Patents No. 2,781,675 and No. 2,783,660.

This transmission is of the full automatic type requiring no external controls or speed selecting devices. The transmission is controlled by the operator through selection of amount of power delivered to the transmission by the motor or engine and the amount of torque required to drive the load, usually the rear wheels of a motor vehicle. It is an infinite ratio type and is capable of delivering many driven ratios from very low up to and through direct drive. The transmission is capable of extreme pulling power or high torque demands. The nature of the transmission is such that it instantly selects the correct ratio for the amount of power or torque being delivered to it and the amount of torque required to satisfy the load.

An object of this invention is to provide a mechanically simplified combined hydraulic and planetary gear transmission which smoothly delivers power to the load and at the most advantageous ratio that accounts for both the torque demand and the power input. The invention is embodied in a transmission that has a fixed reactor shaft about which one group of transmission parts are assembled and which has the forward case secured to the power input shaft, the forward case containing the remainder of the parts of the transmission. Accordingly, the transmission has two assemblies that are connected to complete the assembly of the transmission. The structural organization is important because the transmission can be constructed compactly, comparatively easy and can be serviced after installation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a sectional view of the blading of the transmission and taken on the line 3—3 of Figure 1.

Figure 4 is a schematic view showing flow direction in the transmission.

Figure 1:
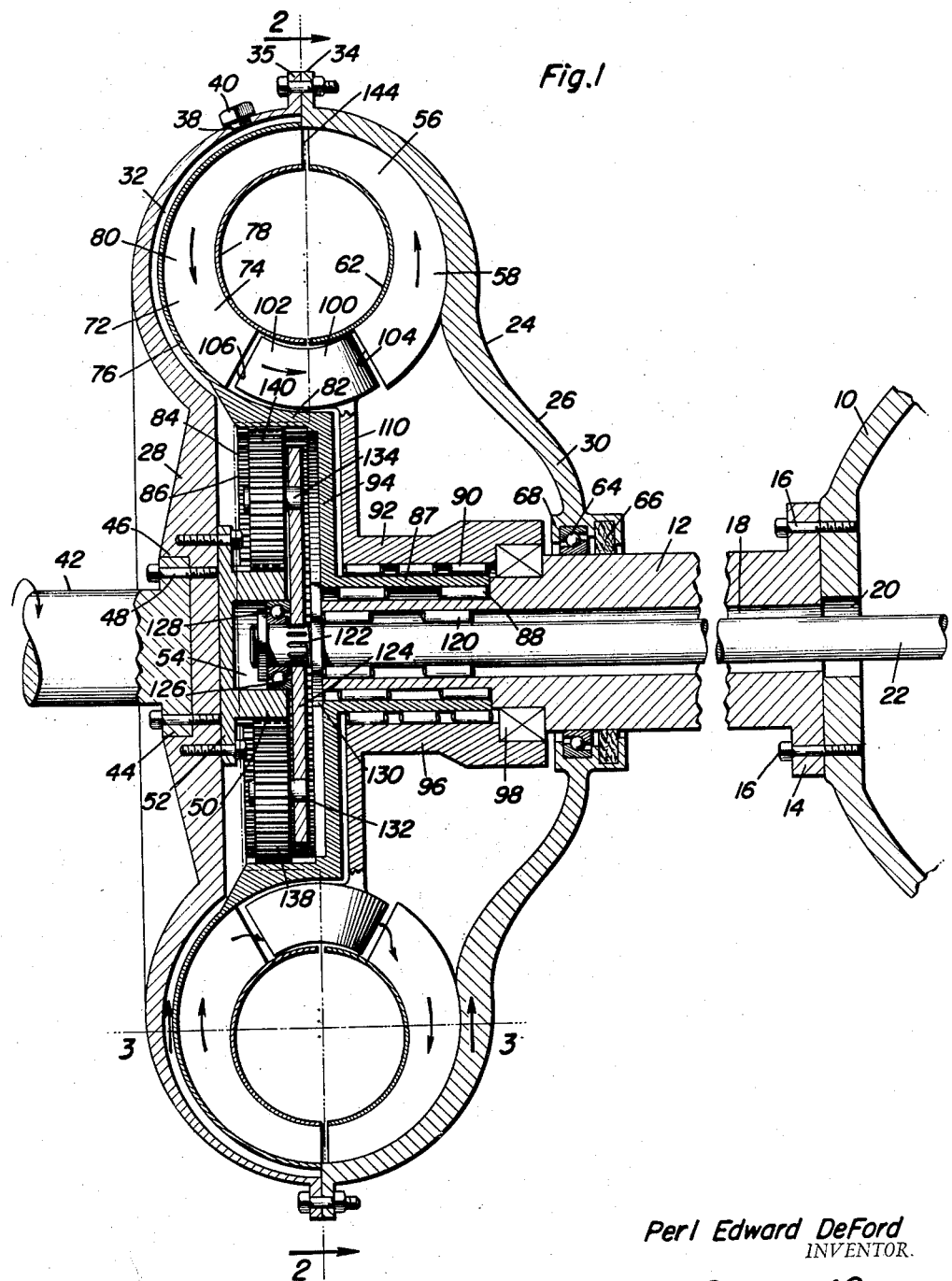
Figure 1 is a longitudinal sectional view of a combined hydraulic and planetary unit transmission exemplifying the invention.
Figure 2:
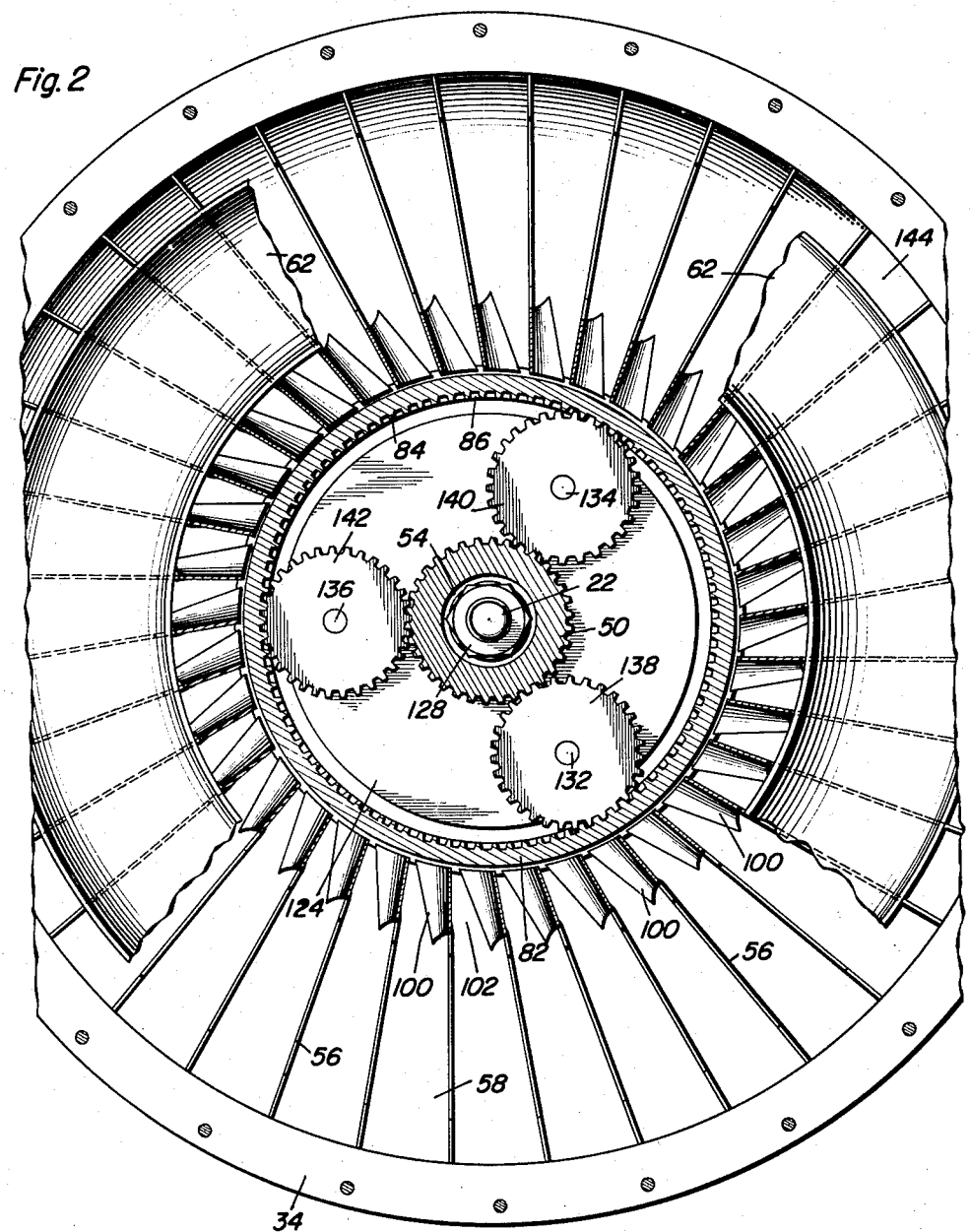
Figure 2 is a sectional view taken on the line 2—2 of Figure 1.

In the drawings there is a flywheel housing 10 that represents a stationary support to which the reactor or quill shaft 12 is made secure. Mounting flange 14 at the extremity of shaft 12 abuts a face of housing 10 and is secured thereto by bolts 16. Reactor shaft 12 is hollow, having passage 18 extending completely through and registered with aperture 20 in housing 10. The power output shaft 22 extends through passage 18 and opening 20 and is on the axis of the transmission.

The combined hydraulic and planetary gear transmission 24 is constructed of a casing 26 having a forward case 28 and a rear case 30 shaped to form a toroidal chamber 32. Confronting flanges 34 and 35 are bolted together so that the forward and rear cases enclose chamber 32. A filler hole 38 is in one of the cases and has a removable filler plug 40 that can be removed for adding or draining oil from the transmission casing 26.

Power input shaft 42 can be driven by a motor or engine or can be the main shaft of a motor or the crankshaft of an engine. Since an important field of application of the transmission is in the automotive field, it shall be assumed that shaft 42 is the crankshaft of a reciprocating engine such as would be found in an automobile, truck, etc. Mounting flange 44 is at the end of shaft 42 and is disposed in recess 46 formed at the axis of the transmission. Bolts 48 in aligned holes in flange 44 and forward case 28 firmly but separately attach the transmission casing to the shaft 42. Sun gear 50 which constitutes a part of a planetary gear assembly, has flange 52 at its base by which it is bolted to the inner face of forward case 28 and directly on the longitudinal axis of rotation of the transmission. Sun gear 50 has a well or recess 54 in its center so that the inner end of power output shaft 22 can be accommodated.

The hydraulic transmission 24 has a pump or impeller 56 made of a plurality of circumferentially arranged blades 58 in chamber 32. Blades 52 are fixed to the inside of the rear case 30 and in an annular arrangement. Each blade is located in a plane slightly askew from radii passing through the transmission axis. Each blade 58 is arcuate along its inner edge when viewed from the side (Figure 1) and the general appearance is of a crescent with the outer end slightly narrower than its inner end. An annular semi-toroidal wall 62 is fixed to the corresponding, arcuate inner edges of blades 58 thereby cooperating with the surface of rear case 30 and the blades 58 to form a group of circumferentially arranged open-ended oil passages. The pump or impeller constructed in this way is carried by the casing 26 and rotates with the power input shaft 42. Impeller 58 and sun gear 50 are fixed with the casing 26, and the casing is attached directly to shaft 42. All other parts of transmission 24 are assembled on the quill shaft 12. Anti-friction bearing 64 and oil seal 66 are carried in a short retainer sleeve 68 on the casing 26. The reactor or quill shaft 12 passes through the bearing 64 and the opening in oil seal 66, enabling the entire casing to rotate with respect to the fixed reactor shaft 12.

The hydraulic section of the transmission has a runner 72 in toroidal chamber 32. The runner is composed of a plurality of circumferentially spaced blades 74 that are fixed to a semi-toroidal back wall 76 located in chamber 32. Blades 74 are of the same shape as blades 58 and have their arcuate edges fixed to a semi-toroidal wall 78 that responds to wall 62. Oil passages 80 are formed by the blades and walls of runner 72. The runner has its blades askew from radii passed through the transmission axis, but the angularity is opposite to the angularity of blades 58 (see Figure 3).

Wall 76 is attached at its inner edge to cylindrical drum 82 whose inner surface has teeth 84 that constitute ring gear 86. The sleeve 87 is mounted for rotation between needle bearings 88 and 90 or an equivalent type of bearing. Bearing 88 is on the reduced inner end of reactor shaft 12 thereby mounting the sleeve 87 so that it is capable of rotation with respect to shaft 12. Bearing 90 is on the outside surface of sleeve 87 and mounts sleeve 92 for rotation thereon. Web 94 is fixed to sleeve 87 and protrudes laterally therefrom. The cylinder 82 is fixed to web 94 thereby mounting the runner 72 for free rotation with respect to reactor shaft 12.

Sleeve 96 is mounted for rotation on bearings 90. A one-way brake or free wheeling unit 98 connects sleeve 92 to the reactor shaft 12 so that sleeve 92 is capable of rotating in one direction only. Reactor 100 has a group of circumferentially spaced smoothly curved blades 102, the curvature being in a direction from end-to-end of the blades. These blades are located between the confronting ends 104 and 106 of the oil passages 56 and 80. The thicker confronting ends of the blades 58 of the pump and runner blades 74 leave exposed circular portions of the walls 62 and 78 and these oppose the outer edges of blades 102. The inner edges of these blades, which appear approximately trapezoidal when viewed from the side (Figure 1) are attached to web 110 and this is fixed to sleeve 92. Therefore, reactor 100 can rotate in one direction only. The flow diagram of Figure 4 shows the direction of movement of the oil and the operation of the transmission. The oil flows in a pattern known as vortex and rotary flow. The entire mass of oil rotates, but in this rotating field, oil passes through the passage group in the runner by being propelled thereinto from the pump. As the liquid leaves the oil passages 80 it is directed by reactor 100 which may be moved at various speeds or may be stopped depending on the load demands and the power input at shaft 42 which are made known to the reactor 100 by the planetary gearing whose sun gear 50 has been mentioned previously.

The power output shaft 22 has bearings 120 mounting it for rotation near its inner end and in passage 18. Splines 122 or equivalent fasteners attach the mounting plate 124 to the shaft 22 and within the confines of ring gear 86. Anti-friction bearing 126 is at the extreme end of the shaft 22, located in recess 54 and held in place by retaining nut 128. This bearing obviates the possibility of whip in shaft 22. Retaining nut 130 is behind gear mounting plate or gear carrier 124 and threaded on the part of the power output shaft 22.

The gear carrier or plate 124 has three pins 132, 134 and 136, each accommodating its planet gears 138, 140 and 142 respectively. The panet gears are enmeshed with sun gear 50 and meshed with the teeth 84 of ring gear 86. In operation, the power input shaft drives the casing 26 about the axis of rotation established by reactor shaft 12. The power output shaft 22 is secured to the planet gearing by being attached to the gear carrier 124. Upon rotation of the casing 26, the pump portion of the hydraulic section is rotated at a speed which is the same as the speed of rotation of shaft 42. The runner 72 has the outer ends 144 of its passages 80 in registry with the passages of the pump 36. As the oil is moved by the pump it is passed to the passages 80. However, there is reactor 100 which deflects the oil flow between the passages of the pump and runner respectively. The reactor can rotate only in one direction while the runner has its internal ring gear 86 enmeshed with the planet gears of the planetary gear section of the transmission. Therefore, the reactor 100 can remain still or rotate in the same direction as the power input shaft 42, but cannot rotate in the opposite direction. The over-running brake 98 acts as a fulcrum when the forces of the oil returning from the runner passages becomes strong enough to force the reactor in a direction opposite to the direction of rotation of input shaft 42. It is at this point that the oil is diverted to forward rotation before re-entering the passages of the pump. This is accomplished by the crescent-shaped blading of reactor 100 and the oil passages that are formed between these blades. Such a condition would exist when the transmission was being called on for maximum output torque. The oil that is diverted by the reactor 100 moves to a new angle generally paralleling the rotation of the pump before re-entering the pump passages at the ends 104 of each.

Figure 5:
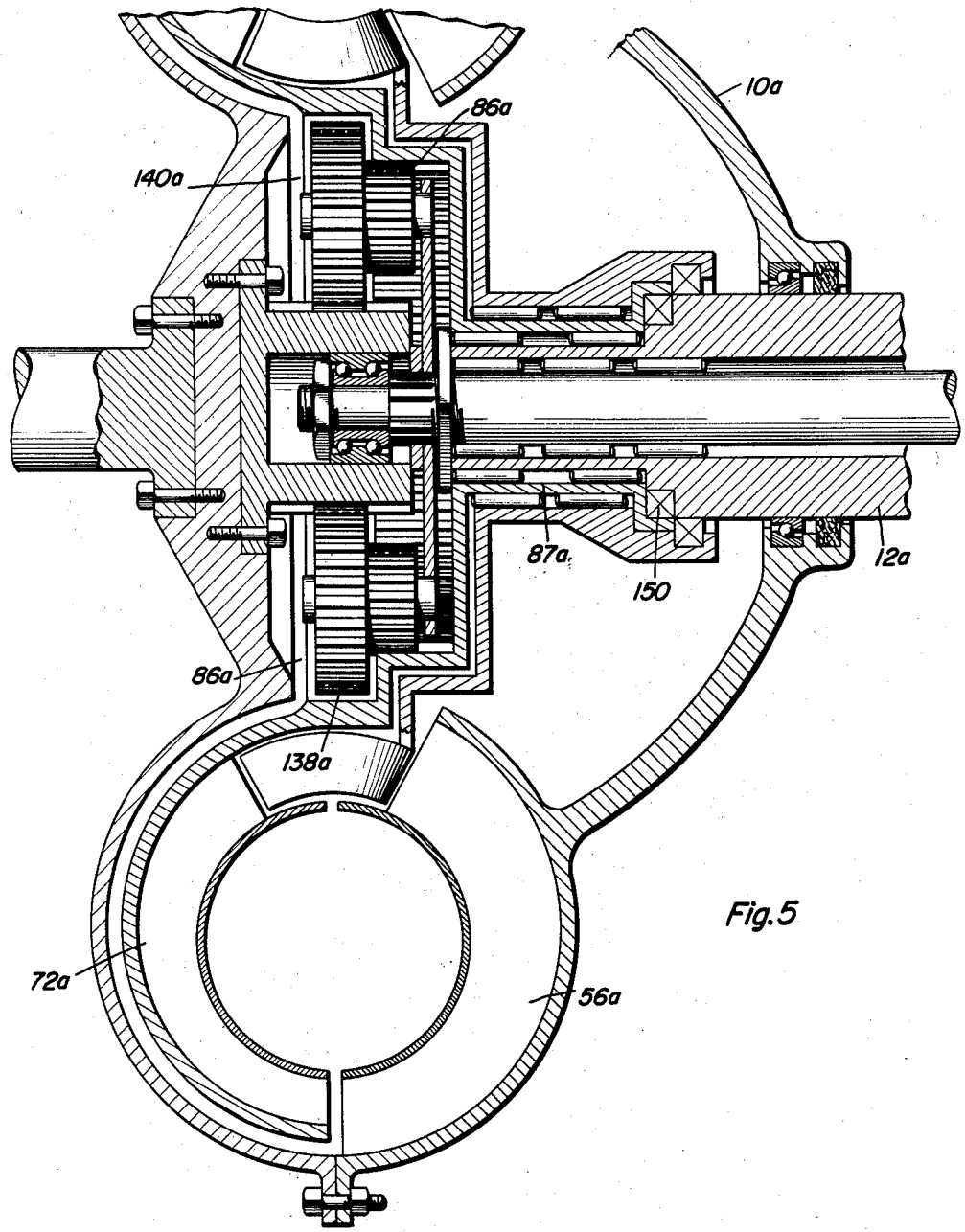
Figure 5 is a fragmentary enlarged sectional view illustrating a modification of the transmission.

Reference is now made to Figure 5 where transmission 10a is fragmentarily illustrated. This is the same as transmission 10 with two main exceptions. Transmission 10a has a double gear reduction in the planetary gearing section which provides a transmission of the type with extremely low gear ratios up through and to direct drive. This makes it more suitable for the heaviest type of equipment, such as tractors, heavy trucks, busses and other heavy industrial equipment. The second distinction is in the runner sleeve 87a. Instead of merely rotating on the reactor or quill shaft 12a, there is a one-way brake 150 operatively connected between sleeve 87a and reactor shaft 12a. This one-way brake or free wheeling unit is standard equipment in the automotive fields, and is identical to one-way brake 98. This permits only one way rotation of the runner 72a giving positive low gear reduction. This would occur only when the pump 36a could no longer turn the runner and ring gear 86a together with the remainder of its associated gearing in the planetary gearing section of the transmission. With these two main exceptions, transmissions 10 and 10a are the same in both construction and function. But these two features make a vast difference in the over-all performance and application of the two transmissions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A power transmission assembly comprising coaxially aligned, spaced drive and reactor shafts, said driveshaft being rotatable and having a casing fixed to that end adjacent said reactor shaft, said casing being of a width greater than the spacing between said shaft so as to enclose one end of the reactor shaft, means journalling said casing upon said reactor shaft, said reactor shaft having a longitudinal bore therethrough and being rigidly fixed to prevent rotation thereof, an output shaft projecting through and journalled in said reactor shaft, and including an inner end portion extending beyond the reactor shaft, a sun gear on the inner side of said casing in alignment with said driveshaft and having a recess therein receiving said inner end of the output shaft, bearing means journalling said inner end of the output shaft within said sun gear, a generally cylindrical drum having a web portion and an annular flange provided with internal ring gear teeth, a hub on said web portion projecting laterally therefrom on the side opposite said flange, said hub surrounding and being journalled upon the inner end of said reactor shaft with said flange surrounding said sun gear, a carrier fixed to said inner end of the output shaft between said web portion of the drum and said sun gear, a plurality of planetary gears rotatably journalled on said carrier and meshing with said sun and ring gears, a sleeve surrounding and journalled upon said hub and having an outer end projecting therebeyond, a one-way brake coupling said outer end of the sleeve to said reactor shaft, a radially projecting hub affixed to the inner end of said sleeve and provided with a plurality of reactor blades peripherally thereof, pump blades fixed to said casing adjacent said reactor blades, and runner blades fixed to said drum adjacent said pump and reactor blades.

2. The assembly as defined in and by claim 1 wherein a one-way brake is provided between the outer end of said hub and the reactor shaft.

References Cited in the file of this patent

UNITED STATES PATENTS

| | | |
|---|---|---|
| 2,157,230 | Cotterman | May 9, 1939 |
| 2,277,214 | Dodge | Mar. 24, 1942 |
| 2,334,394 | Dodge | Nov. 16, 1943 |
| 2,515,831 | McFarland | July 18, 1950 |
| 2,523,907 | Jandasek | Sept. 26, 1950 |
| 2,781,675 | De Ford | Feb. 19, 1957 |
| 2,783,660 | De Ford | Mar. 5, 1957 |